No. 846,566. PATENTED MAR. 12, 1907.
J. S. HIGHFIELD.
HIGH TENSION DIRECT CURRENT ELECTRIC SYSTEM.
APPLICATION FILED DEC. 21, 1906.
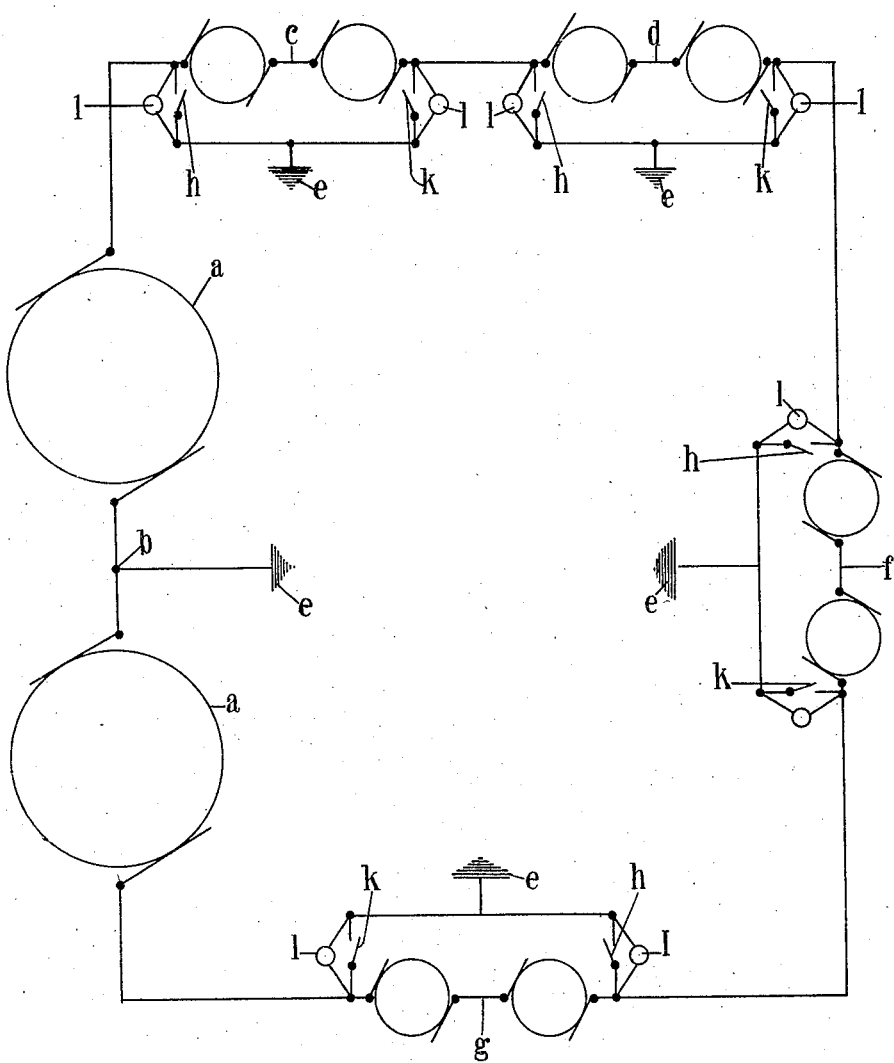

UNITED STATES PATENT OFFICE.

JOHN SOMERVILLE HIGHFIELD, OF LONDON, ENGLAND.

HIGH-TENSION DIRECT-CURRENT ELECTRIC SYSTEM.

No. 846,566.  Specification of Letters Patent.  Patented March 12, 1907.

Application filed December 21, 1906. Serial No. 348,948.

*To all whom it may concern:*

Be it known that I, JOHN SOMERVILLE HIGHFIELD, M. Inst. C. E., M. Inst. E. E., electrical engineer, a subject of the King of Great Britain, residing at 16 Stratford Place, in the city and county of London, England, have invented new and useful Improvements Relating to High-Tension Direct-Current Electric Systems, of which the following is a specification.

This invention relates to direct-current systems of electric supply wherein the motors or other apparatus to which power is supplied at substations, for instance, are arranged in series on the line. In such systems it is convenient to employ a single line arranged in the form of a loop, and it is desirable to make some provision so that in case of failure of the single line the supply will not be seriously interrrupted.

According to this invention the generators at the central station are so arranged that one point at or about the middle of the set of generators is connected to earth, while the lines are connected to opposite ends of the set of generators, so that part of the cable system will be at a certain pressure above earth potential and part below earth potential. At various points in the line, preferably at substations, arrangements are then made so that the line can be earthed.

The invention is illustrated by the accompanying drawing, which is a general diagram of the connections of the system.

In the figure, $a\ a$ are the main generators connected in series at the central station. The mid-point $b$ of the system is connected to earth at $e$.

$c\ d\ f\ g$ are substations at which motors are in use or at which electrical energy is consumed in some other way. At each station an efficient "earth" $e$ is provided, and the incoming and outgoing ends of the line are adapted to be joined by switches $h\ k$ to this earth.

$l\ l$ are voltmeters, each inserted between the earth and either the incoming or outgoing end of the line at the substation. In normal working these voltmeters $l$ will rarely or never indicate no pressure. If, however, a fault occurs on the line between any two stations, the voltmeters at the substations connected to the ends of that section of the line will both drop to zero, indicating that a fault has occurred, and the operators will establish earth connections cutting out the faulty section. Supposing that the fault occurs between the stations $f$ and $g$, the operators at these stations will switch on an earth connection to that part of the line through $k$ at station $f$ and $h$ at station $g$, thus establishing a connection with the middle point of the generating plant. The system is thus split up into two parts, one part, containing station $g$, for instance, being supplied from one section of the generating plant through a portion of the line with an earth return through its switch $h$, while the other part, containing, for instance, the stations $c$, $d$, and $f$, is supplied from the other portion of the generating plant through earth and the switch $k$ at station $f$ and back through the remainder of the cable-line. The faulty section is in this way cut out without seriously interfering with the working of the system, and the fault can be repaired at leisure. The earthing can be effected in any convenient way, but preferably through switches connected to conducting masses which are buried at a considerable distance below the surface of the earth.

The arrangements for earthing are not necessarily provided at substations only, as similar arrangements may be placed in any convenient positions on the line—as, for instance, at private consuming-stations which are on the series system of supply.

If desired, the connection of the line to zero at a substation may be caused to follow automatically upon a fault occurring in the line—that is to say, the action of the switches $h\ k$ may be made automatic. These switches may then be of any of the ordinary types which are adapted to close upon an excess current flowing or upon the voltage falling to zero.

It will be understood that the connections shown in Figure 1 are not the only possible connections which could be used to carry out the invention. Such modifications, for instance, as the use of a single voltmeter at each station, adapted to be connected between the earth and either end of the line, are apparent to any electrician and need not be, therefore, further referred to.

What I claim is—

1. In a direct-current system of electric supply the combination of the apparatus for generating the current and a plurality of consuming-stations, a line connecting said stations in series, a permanently-earthed conductor at the generating place electrically connected with the generating apparatus at an intermediate and neutral point, and a plurality of earthed conductors at various points in the system with means for connecting the line to earth through said conductors at such points.

2. In a system of direct-current electric supply the combination of a power-generating plant and an earthed connection at an electrically intermediate point in said plant, a plurality of consuming-stations and a line connecting said stations in series to the terminals of the generating plant, a plurality of permanently-earthed conductors adjacent to the line at various points thereof, and two connections from each of said earthed conductors leading to two points on the line at opposite sides of power-consuming apparatus therein, each of said connections including a switch whereby the line may be connected directly to the earthed conductor.

In testimony whereof I have signed my name to this specification in the presence of two subscribing witnesses.

JOHN SOMERVILLE HIGHFIELD.

Witnesses:
H. D. JAMESON,
W. C. BARRETT.